United States Patent [19]

Overall et al.

[11] Patent Number: 5,982,408
[45] Date of Patent: Nov. 9, 1999

[54] METHOD AND APPARATUS FOR HSYNC SYNCHRONIZATION

[75] Inventors: Gary Scott Overall; Thomas Campbell Wade, both of Lexington, Ky.

[73] Assignee: Lexmark International, Inc., Lexington, Ky.

[21] Appl. No.: 08/838,581

[22] Filed: Apr. 10, 1997

[51] Int. Cl.$^6$ .................................................. H04N 7/62
[52] U.S. Cl. .......................... 347/250; 347/248; 347/249; 347/234; 347/235; 327/150; 327/153; 327/161; 358/409
[58] Field of Search ..................................... 347/235, 248, 347/249, 250, 247, 234; 327/146, 150, 153, 161; 364/703; 358/298, 409

[56] References Cited

U.S. PATENT DOCUMENTS

| | | | |
|---|---|---|---|
| 3,506,785 | 4/1970 | Harris | 178/69.5 |
| 3,758,710 | 9/1973 | Crosno | 178/6.6 TC |
| 4,133,007 | 1/1979 | Wesslet et al. | 358/409 |
| 4,166,250 | 8/1979 | Meki et al. | 327/160 |
| 4,251,831 | 2/1981 | Kamath | 348/617 |
| 4,279,002 | 7/1981 | Rider | 358/409 |
| 4,290,085 | 9/1981 | Kolker | 358/409 |
| 4,489,342 | 12/1984 | Gollinger et al. | 348/540 |
| 4,542,416 | 9/1985 | Honjo et al. | 386/88 |
| 4,658,300 | 4/1987 | Kawamura et al. | 358/409 |
| 4,695,873 | 9/1987 | Smith | 348/496 |
| 4,713,690 | 12/1987 | Watanabe et al. | 348/537 |
| 4,713,691 | 12/1987 | Tanaka et al. | 348/537 |
| 4,788,601 | 11/1988 | Kawasaki | 386/48 |
| 4,796,095 | 1/1989 | Shimada | 358/409 |
| 4,825,306 | 4/1989 | Robers | 360/53 |
| 4,845,358 | 7/1989 | Asada | 250/235 |
| 4,926,263 | 5/1990 | Yokota | 358/474 |
| 4,943,857 | 7/1990 | Izuno et al. | 348/537 |
| 5,045,951 | 9/1991 | Kimura et al. . | |
| 5,109,283 | 4/1992 | Carley | 358/298 |
| 5,122,883 | 6/1992 | Carley | 358/296 |
| 5,179,438 | 1/1993 | Morimoto | 348/536 |
| 5,247,229 | 9/1993 | Ngo et al. | 315/364 |
| 5,293,274 | 3/1994 | Yamada | 386/85 |
| 5,303,065 | 4/1994 | Kwarta | 358/409 |
| 5,309,111 | 5/1994 | McNeely et al. | 327/7 |
| 5,331,342 | 7/1994 | Shimatani et al. | 347/249 |
| 5,343,336 | 8/1994 | Sasajima | 360/55 |
| 5,347,322 | 9/1994 | Levine et al. | 348/718 |
| 5,406,386 | 4/1995 | Yamada | 358/406 |
| 5,438,353 | 8/1995 | Morrison | 347/250 |
| 5,457,487 | 10/1995 | Sakaki et al. | 347/116 |

*Primary Examiner*—N. Le
*Assistant Examiner*—Hai C. Pham
*Attorney, Agent, or Firm*—John A. Brady

[57] ABSTRACT

A method of achieving line-to-line synchronization having a high degree of synchronization accuracy. Synchronization is performed by a specific high-speed block of logic which signals the beginning of scans to a PELCLK-based logic at pel boundaries, and provides sub-pel shifting as it passes data between the pel generation logic and a laser control signal. The synchronization error is made as small as propagation delays through a single multiplexer element. Such delays can be controlled to values less than ½ ns. The need to stop and restart the clocks is eliminated. All complex pel generation logic is clocked with the relatively low frequency PELCLK without regard to the synchronization task.

51 Claims, 9 Drawing Sheets

METHOD AND APPARATUS FOR HSYNC SYNCHRONIZATION

BACKGROUND OF THE INVENTION

1. Field of the Invention

The present invention relates to a method for achieving line-to-line synchronization. The invention allows for extremely accurate horizontal synchronizing signal (Hsync) Synchronization while not interfering with clock generation. The method overcomes line-to-line synchronization problems in a simplified design, while providing near-zero line-to-line placement error.

2. Description of the Prior Art

A critical parameter which affects the output quality of any raster scanning device is the accuracy of the line-to-line synchronization. Raster scanning devices such as laser printers or video displays typically supply a horizontal synchronization signal (HSYNC) as the laser, or illuminating beam, crosses the plane of a fixed detection means, usually located before, and near the beginning of each new scan. The HSYNC signal generated on each new scan serves as an indication that the beam is crossing a fixed horizontal reference point. Digital systems such as laser printers, must monitor the HSYNC signal and use it as a reference for the serialization of digital video data for the scan. Since digital systems are clocked at fixed intervals with no synchronous relationship to the physical generation of the HSYNC signal, line-to-line horizontal synchronization error can result.

For example, a digital system with a memory bitmap in which a single bit corresponds to a physical $\frac{1}{600}"\times\frac{1}{600}"$ area of the printed page might be clocked at a period equal to the time required for the laser to sweep $\frac{1}{600}"$ across the imaging surface. Therefore, the leftmost serialized bit of any scan is placed at a fixed number of clocks after the clock which first sampled an active HSYNC. Since the HSYNC signal can occur at any position between the clock edges, but the digital logic can produce new bits of video data coincident with the clock edges, the physical placement of the first pel, (a pel being one bit of a memory bitmap used to represent an image in a digital memory system,) may be in error by as much as $\frac{1}{600}"$. Any inaccuracies in line-to-line synchronization cause misalignment of pels which result in visible artifacts.

The bit is translated by the imaging device into a physical space corresponding to the image resolution, such as $\frac{1}{600}"\times\frac{1}{600}"$. The time required by the imaging device to sweep across that area is referred to as the pel time. PELCLK is a clock used to operate portions of a digital imaging system whose period is one pel time.

A slice is generally the number of discrete periods into which each pel is subdivided. By operating on a portion of a pel, various duty-cycles and print improvements may be obtained. The slice time corresponds to the pel time divided by the number of slices which make up the pel. SLICECLK is a clock used to operate portions of a digital imaging system whose period is one slice time.

There are three primary methods of reducing line-to-line placement error.

The first involves a high speed slice clock. A design can address line-to-line synchronization by running an internal clock, SLICECLK, at a higher frequency than the clock that is synchronous with the pel generation (PELCLK). The PELCLK signal is usually generated via divider logic which produces a new active edge of PELCLK every n counts of a counter. Using such an approach, it is possible to sample the HSYNC signal at a higher frequency than PELCLK. After sampling an HSYNC signal with the SLICECLK logic, the logic must restart PELCLK for each scan by resetting the divider logic which generates PELCLK. The foregoing method produces a first edge of PELCLK which has a maximum error equal to the period of SLICECLK. For example, if the SLICECLK runs at 4 times the frequency of PELCLK, the placement error can be as much as $\frac{1}{4}$ pel, or $\frac{1}{2400}"$ in a 600 dpi (dot per inch) printer.

While the foregoing method provides more line-to-line synchronization accuracy than simply using PELCLK, PELCLK must either be stopped at the end of a scan and restarted on HSYNC, or it must contain some discontinuity at the point where the PELCLK divider is reset by HSYNC.

A second method utilizes high speed slice clock with PELCLK synchronization on either edge of SLICECLK. Previous Lexmark™ printer designs have employed a method using a high frequency clock that samples HSYNC on both rising and falling edges. When an HSYNC is sampled, control logic then generates a SLICECLK which is either the "true" or "inverted" version of the sampling clock dependent on which edge first sampled the active HSYNC signal. As a result, the first SLICECLK edge is within $\frac{1}{2}$ of a clock period from the HSYNC signal.

As was the case in the previous method, the PELCLK is generated by logic which divides SLICECLK. The logic turns SLICECLK off at the end of a scan and restarts it when either edge of the high frequency sampling clock sees the HSYNC signal. Since the divider that generates PELCLK is also reset at the end of the scan, the first SLICECLK of a new scan restarts the divider, thus synchronizing PELCLK to within $\frac{1}{2}$ of a SLICECLK. For example, if the SLICECLK runs at four times the frequency of PELCLK, the placement error can be as much as $\frac{1}{8}$ pel or $\frac{1}{4800}"$ in a 600 dpi printer.

The foregoing method has the advantage of providing more line-to-line synchronization accuracy than simply using PELCLK or SLICECLK. The accuracy is potentially two times better than using a single edge of SLICECLK. However, the method has disadvantages. The SLICECLK must be stopped at the end of a scan and restarted on HSYNC, thereby producing a discontinuity in SLICECLK both at the end of the scan when attempting to stop the clock, and at the beginning of the scan when attempting to restart a new one. Such discontinuities can result in clock pulse widths that violate timing specifications for clocked components. Since the SLICECLK is high frequency, pausing and restarting the clock without generating glitches becomes more difficult.

Furthermore, as laser printer speeds continue to increase, so must the clock frequencies required to accurately sample HSYNC. At sixteen pages per minute print speed on the Optra™ family of printers, a clock frequency of 53 mHz is required to provide $\frac{1}{4800}"$ line-to-line synchronization accuracy. At 24 pages per minute, a frequency of approximately 85 mHz is required to provide the same accuracy. With today's available silicon geometries, it is impractical to clock an entire complex pel generation logic block at such frequencies.

Figure 1:
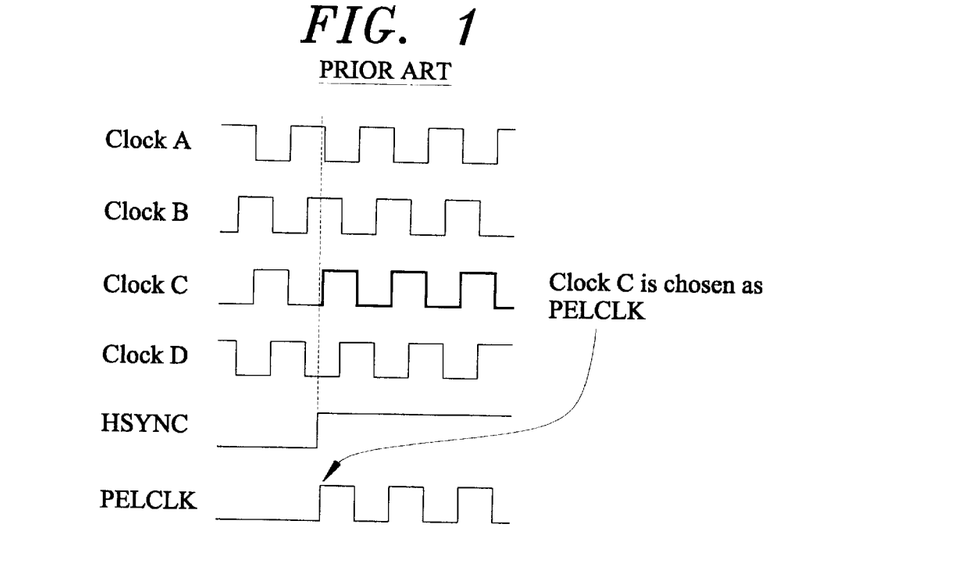
FIG. 1 is an example of a clock selection algorithm according to the prior art.

A third method involves clock selection. U.S. Pat. Nos. 5,438,353, 5,109,283 and 5,122,883 describe similar methods of achieving line-to-line synchronization. These patents describe a system which produces the lower frequency PELCLK and achieves synchronization with the HSYNC signal by restarting the PELCLK with its first edge nearly coincident with HSYNC. The designs generate several clocks at the pel frequency. Each clock is successively offset in phase from its predecessor by a delay element. As the HSYNC signal becomes active, the logic examines all clocks and selects the clock which has the closest phase relationship to HSYNC. The selected clock then becomes PELCLK for the scan, and the process is repeated on successive scans. FIG. 1 illustrates such a method.

The clock selection method is advantageous by allowing near perfect accuracy in the phase relationship between HSYNC and the PELCLK. The phase difference between HSYNC and PELCLK can be as small as one delay element. Also, there is no need for high frequency logic which samples HSYNC.

The clock selection method has disadvantages. Most printer systems require the ability to subdivide a pel into slices to perform such actions as pel duty cycle modulation and pel edge shifting. This requires the use of a clock that is higher frequency than PELCLK. If each scan starts a new PELCLK with various phase relationships, it may be difficult or impossible to use higher frequency SLICECLK since it has no consistent phase relationship with PELCLK. In order to use this approach in a system which requires both a PELCLK and a SLICECLK, the design may need to select among phase-shifted SLICECLK's on each new scan and then generate PELCLK by dividing SLICECLK. With a clock selection method, it becomes more difficult to stop and restart SLICECLK due to its higher frequencies.

SUMMARY OF THE INVENTION

The foregoing and other deficiencies of the prior art are addressed by the present invention which is directed to a method of achieving line-to-line synchronization having a high degree of synchronization accuracy. The synchronization task is left to a specific high-speed block of the logic which signals the beginning of scans to the PELCLK-based logic at pel boundaries, and provides sub-pel shifting as it passes data between the pel generation logic and the laser control signal.

An object of the present invention is to make the synchronization error imperceptibly small. The invention may be used to control synchronization error to a level equal to the propagation delay through a single multiplexer element. Such delays can be controlled to values less than ½ ns in presently available silicon geometries.

Another object of the present invention is to eliminate the need to stop and restart the clocks.

Another object of the present invention is to clock all complex pel generation logic with the relatively low frequency PELCLK without regard to the synchronization task.

BRIEF DESCRIPTION OF THE DRAWINGS

These and other attributes and objects of the present invention will be described with respect to the following drawings in which.

DETAILED DESCRIPTION OF THE INVENTION

Figure 2:
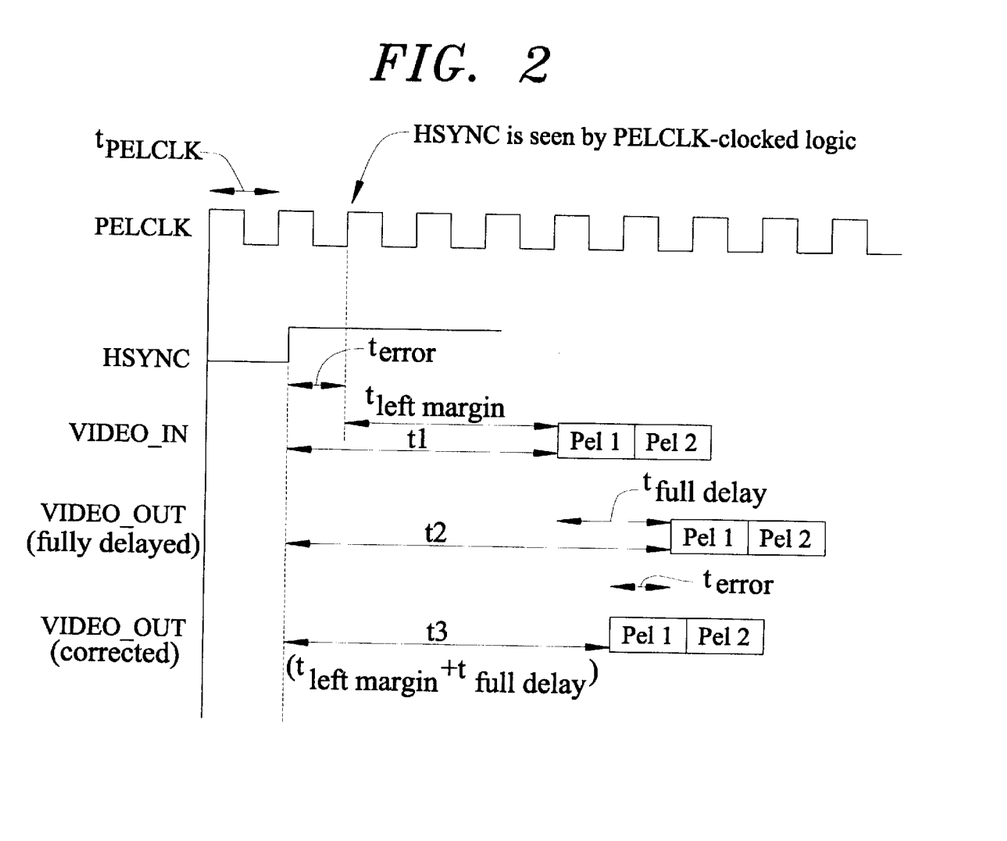
FIG. 2 is a waveform diagram representing the signals according to the method of the present invention.

Referring to FIG. 2, according to the method of the present invention, as a new scan line begins, the HSYNC signal goes active. At the next rising edge of PELCLK, the active HSYNC is seen by the pel-based logic. The time between the rise of HSYNC and the next active edge of PELCLK is labeled $t_{error}$. The parameter $t_{error}$ can be between 0 and the period of PELCLK, and is unknown to the pel-based logic.

After seeing an active HSYNC, the pel-based logic waits a specified number of PELCLKs to establish a left margin. In this example, the time elapsed for the left margin, $t_{left\ margin}$, is the time required for 3 edges of PELCLK. After the expiration of the left margin, the pel-based logic then outputs the first pel of the scan on its VIDEO_IN signal. If the VIDEO_IN signal were actually used to drive the laser, the total time between HSYNC and the first VIDEO_IN is:

$$t1 = t_{error} + t_{left\ margin}.$$

The parameter $t_{error}$ actually represents the line-to-line synchronization error and varies between 0 and $t_{PELCLK}$, (the time for one cycle of PELCLK). If the $t_{error}$ factor were eliminated, perfect line-to-line synchronization could be achieved. Referring to FIG. 2, if the VIDEO_IN signal were sent through a chain of delay elements, whose output is VIDEO_OUT. Now the total time between activation of HSYNC and VIDEO_OUT would be represented as:

$$t2 = t_{error} + t_{left\ margin} + t_{full\ delay}.$$

The parameter $t_{full\ delay}$ is the time required to propagate through the full chain of delay elements. Both t1 and t2 still include the $t_{error}$ factor which represents the line-to-line synchronization error. If it were possible to reduce the time required to propagate through the delay chain by $t_{error}$, the $t_{error}$ could be eliminated, illustrated by the following equation:

$$t3 = t_{error} + t_{left\ margin} + [t_{full\ delay} - t_{error}] = t_{left\ margin} + t_{full\ delay}$$

From the foregoing equation, t3 achieves perfect line-to-line synchronization by elimination of the $t_{error}$ factor. The elimination of the $t_{error}$ factor is the crux of the method of the present invention and will be described with reference to FIG. 3.

Figure 3:
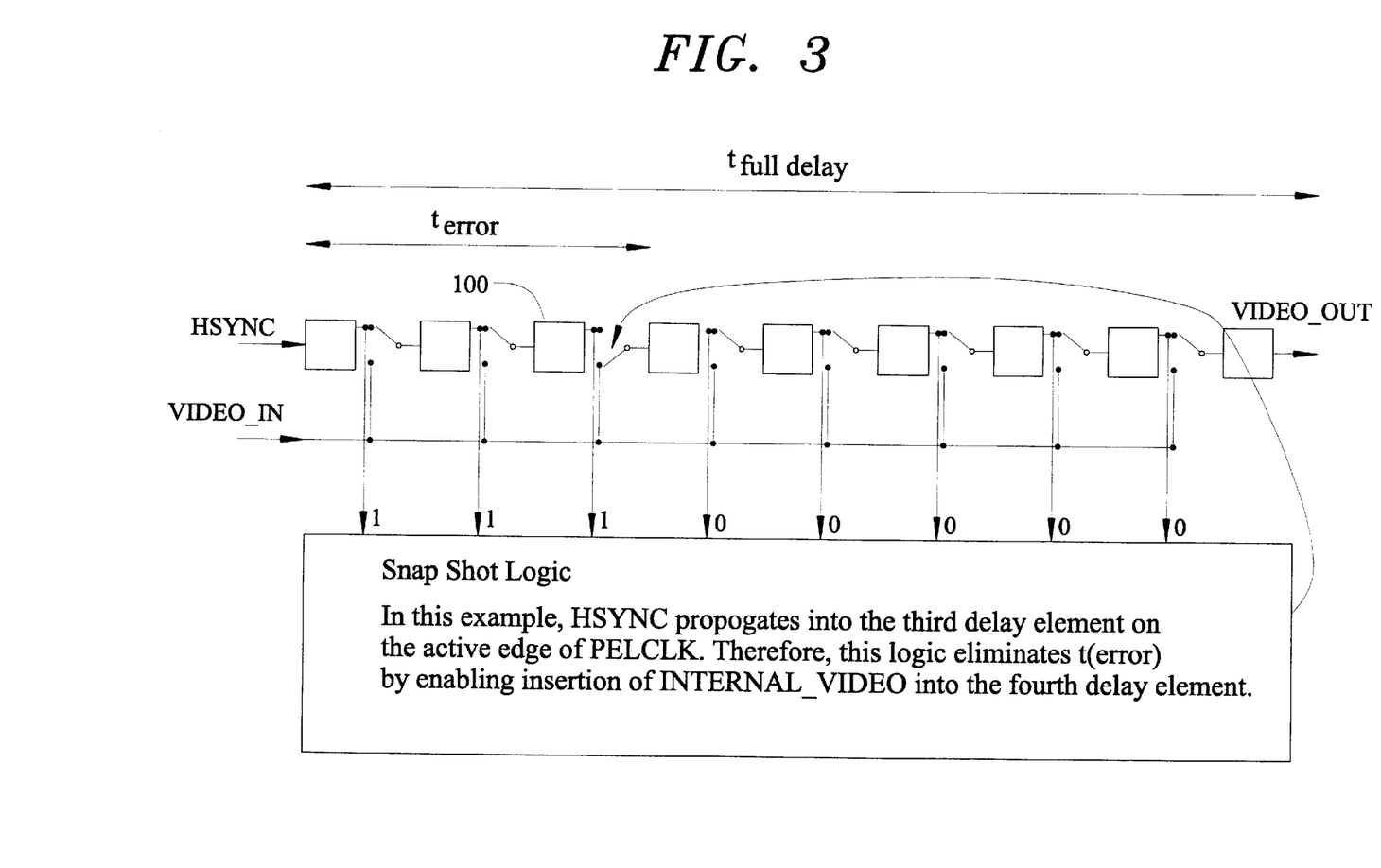
FIG. 3 is a block diagram illustrating a delay chain for implementing the method of the present invention, according to the present invention.

The delay chain 100 depicted in FIG. 3 is the chain that contributes to the $t_{full\ delay}$ factor for t2 and t3. Since the laser is not imaging on a printable section of its scan when HSYNC is detected, VIDEO_IN does not need to be passed through the chain while the logic is searching for HSYNC. Therefore, the design of FIG. 3 passes an HSYNC itself into the delay chain during that time. On the first PELCLK which detects a HSYNC, the depicted "snapshot logic" measures the distance HSYNC has shifted into the delay chain. Later, when serializing the scan, the "snapshot logic" uses only the remaining delay elements to provide the delay between VIDEO_IN and VIDEO_OUT.

In the example shown in FIG. 3, HSYNC has shifted three elements into the delay chain at the active edge of PELCLK. For this scan, these three elements of delay correspond to the $t_{error}$ described. The snapshot logic then eliminates the $t_{error}$ factor by inserting VIDEO_IN into the fourth element. It is important to note that $t_{full\ delay}$ must always be greater than the period of PELCLK so there are always some remaining delay elements for insertion of VIDEO_IN. In the method of the present invention, the delay chain can either be a high speed clocked shift register or simply a series of analog logic delays. In either case, the $t_{error}$ factor is always accurately eliminated, even if the speed of the delay elements vary.

The digital gate-level implementation of the present invention is comprised primarily of similar groups of logic functions, called synchronizer elements. The synchronizer elements may be cascaded in a serial manner to form a means for positioning the HSYNC signal accurately within a given sampling period (such as pel time). Each synchronizer element includes two main parts, a delay stage and a memory element. The purpose of the delay stage is to provide a known amount of delay from input signal to output signal. The function of the memory element is to remember, for an entire scan, if the HSYNC signal at the start of the scan passed completely through the delay stage prior to the beginning of the next sampling period.

Figure 4A:
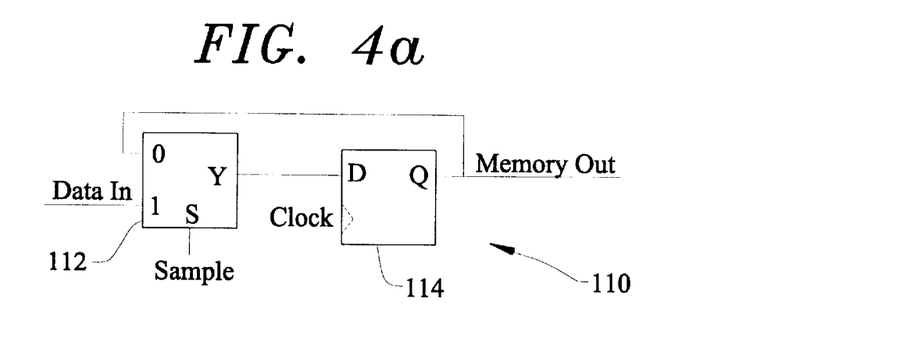
FIGS. 4a–c are diagrams of elements of the delay chain of FIG. 3 shown in terms of digital logic elements, according to the present invention.
Figure 4B:
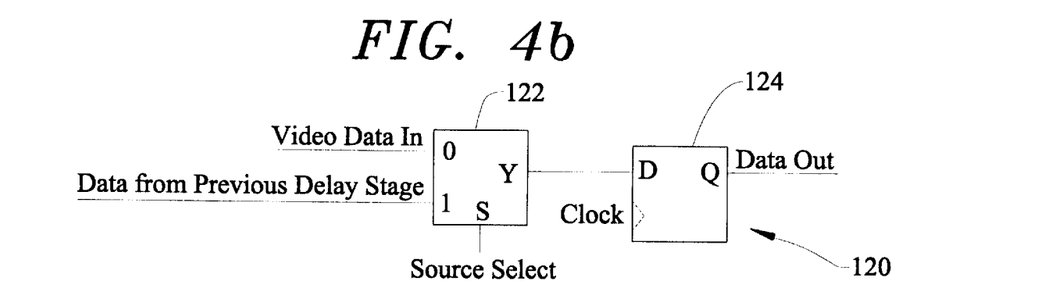
Figure 4C:
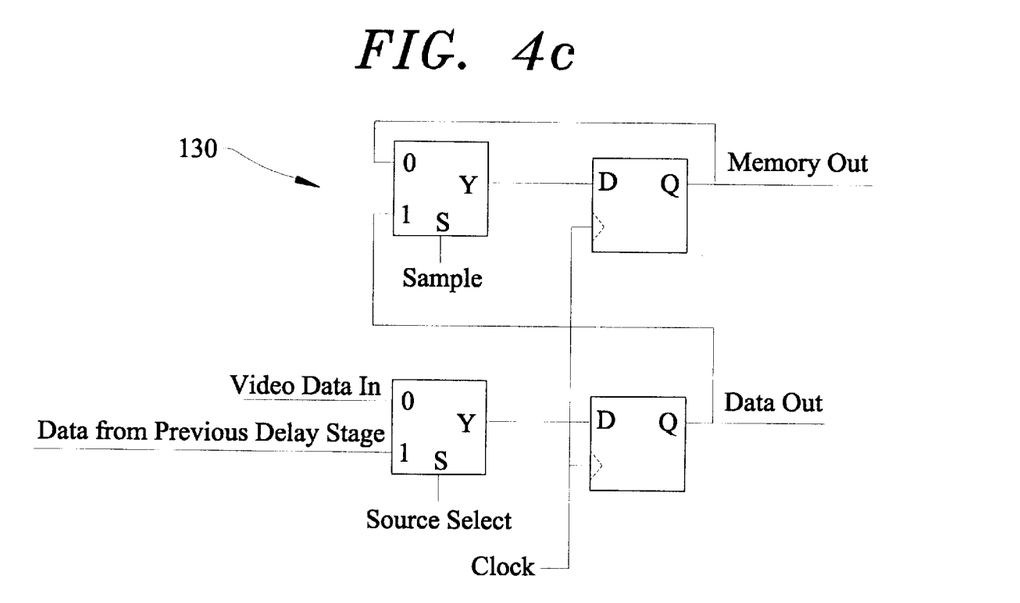

FIGS. 4a–c illustrate the memory elements as digital logic symbols. FIG. 4a shows the synchronous memory element 110, which includes a simple multiplexer 112 and data flip-flop 114.

When the Sample control is set, Data In is passed through to the Memory Out on an active edge of Clock. If the Sample signal is not set, the previous Memory Out is retained.

FIG. 4b shows a clock-based delay stage 120, which uses a multiplexer 122 and a flip-flop 124 as well. The Source Select chooses whether the data comes from the previous delay stage or from the input video data. On an active edge of the clock, this data is passed through to the data out.

The memory element and the delay stage are combined, in the embodiment shown in FIG. 4c, to form a clock-based synchronizer element 130. The synchronizer element is generally operated in one of two modes, synchronization mode and print mode. When in synchronization mode, the delay stage Source Select is set to choose only "Data from Previous Delay Stage". The memory element then periodically samples to determine the state of the delay stage Data Out. At the end of synchronization mode, the state of the Memory Out output is then used during print mode to determine how the Source Select should be controlled for the next Synchronization Element.

Figure 5:
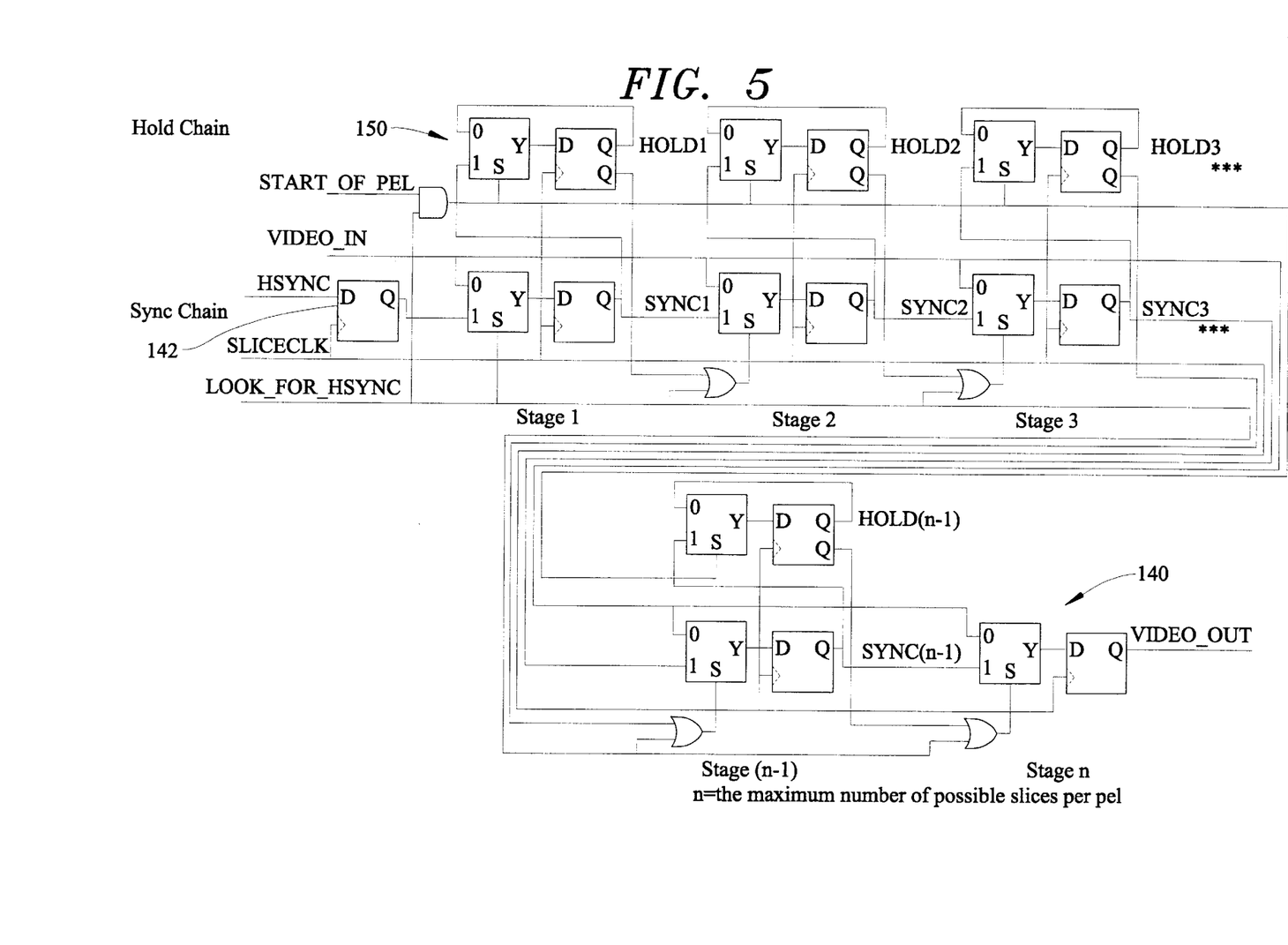
FIG. 5 is a block diagram showing the delay chain of FIG. 3 with cascaded clock-based synchronizer elements of FIG. 4, according to the present invention.

The clock-based synchronizer elements, when cascaded, form a synchronization chain 140 as shown in FIG. 5. The incoming HSYNC signal is buffered by a flip-flop 142 prior to use in the synchronization chain 140. The buffered version, Buf_Hsync, is then sent into the first synchronization element of stage 1 as shown, and it is also sent to control logic to signal that an HSYNC pulse has arrived. When the circuit is in synchronization mode, Look_for_Hsync is active. After the HSYNC pulse has been recognized by the control logic, Look_for_Hsync goes inactive, forcing the synchronization chain 140 into print mode. The Start_of_Pel signal goes high for the first SLICECLK period of each PELCLK. On the Start_of_Pel in synchronization mode, the chain of memory elements 110(denoted the "Hold Chain" 150) sample the state of the clock-based delay elements. While in synchronization mode, these samples will occur on a once per pel basis until the HSYNC pulse arrives.

Once HSYNC enters the ASIC, it will propagate through some number of synchronization elements 130 until a Start_of_Pel occurs. The number of synchronization elements 130 passed through prior to the Start_of_Pel depends on the temporal relationship between HSYNC and PELCLK. On the first Start_of_Pel after HSYNC, the Hold Chain 150 samples to determine how far down the Sync Chain 140 the HSYNC has propagated. At the same time, control logic, not shown, recognizes that an HSYNC has been received (by looking at Buf_Hsync) and shuts off the Look_for_Hsync control forcing the circuit into print mode. Once Look_for_Hsync is removed, the Hold Chain 150 is prohibited from sampling for the remainder of the scan. Also with Look_for_Hsync removed, the Source Selects for each clock-based delay element 120 in the Sync Chain 140 are no longer forced to look at the output of the previous stage. Instead, the chosen data source for each delay element 120 is now determined by the state of the previous stage's Hold status. Thus, if a given stage saw HSYNC while in synchronization mode, then the next stage will choose the direct Video_In during print mode. A stage which did not see HSYNC while in synchronization mode will force the following stage to select its data output, rather than incoming Video_In. Therefore, the Video_In will be selected as the data source for all synchronization elements 130 along the path that the HSYNC pulse had covered during synchronization mode. The last element whose source is Video_In will propagate its output down through the remaining synchronization elements 130, effectively bypassing all prior synchronization elements 130. The bypassing of these stages corresponds to the elimination of the $t_{error}$.

Figure 6:
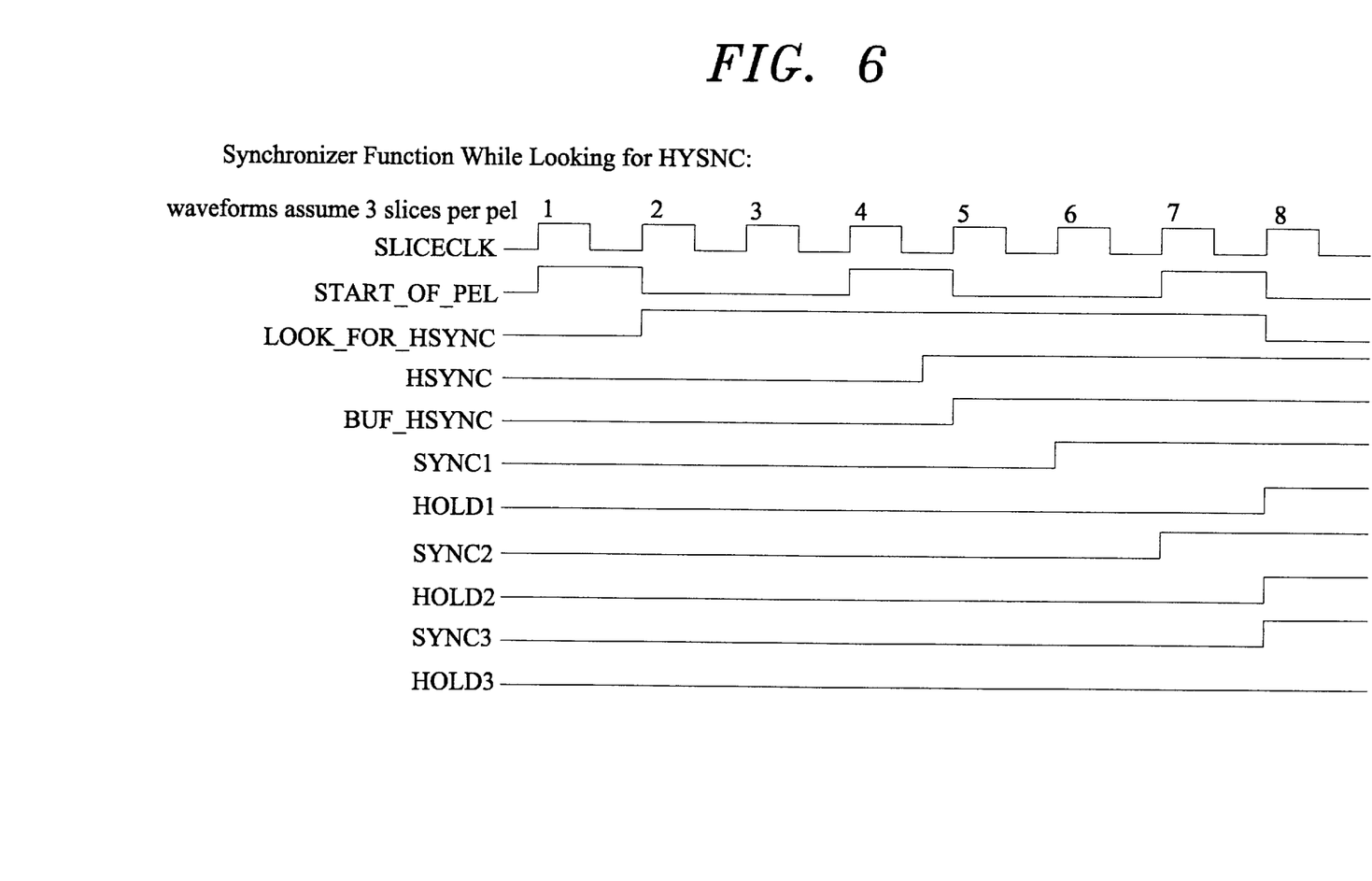
FIG. 6 is a waveform diagram of clock-based synchronization while looking for HSYNC, according to the present invention.

Sample waveforms for clock-based synchronization are shown in FIG. 6. The goal of the circuit is to determine how many slices occurred between the start of a pel and the occurrence of an HSYNC. For simplicity, a ratio of three slices to comprise every pel is shown in FIG. 6. Therefore, the Start_of_Pel signal is asserted once every three SLICE-CLKs. Following the Start_of_pel in period 1, Look_for_Hsync began. Note that an HSYNC was recognized by the circuit as an asynchronous input which occurred sometime during period 4, thus Buf_Hsync went high on the start of period 5. Buf_Hsync then begins to propagate through the Sync Chain 140 setting to a high logic state Sync1, Sync2, and Sync3 on successive clocks 6, 7, and 8, respectively. Since Buf_Hsync goes high on the start of period 5, the next Start_of_Pel is not recognized by SLICECLK until period 8. On the rising edge of SLICECLK to start period 8, Start_of_pel and Look_for_Hsync are both high, allowing the Hold Chain 150 to sample the state of the Sync Chain 140. The Hold Chain 150 sampling of the Sync Chain at the beginning of period 8 causes the Hold Chain 150 to go to a binary state of b'1100000' if 8 synchronization elements are used. (As shown in FIG, 6, the Hold element of the final synchronization stage need not be included. Thus the positioning of Video_In for an 8 element Sync Chain can be determined with a 7 element Hold Chain 150.)

Once the HSYNC signal has been recognized, control logic will force Look_for_Hsync to go low, putting the synchronizer circuit into print mode during period 8. Once in print mode, the Hold Chain 150 will "hold" its previous value b'1100000', for the duration of the laser scan. As stated previously, in print mode, each element of the Sync Chain 140 chooses Video_in if the previous Hold Chain element 140 was set, otherwise it chooses the output of the previous clock-based delay element 120. The first element in the chain always chooses Video_In as it has no previous delay element from which to choose. In FIG. 6, a Hold Chain value of b'1100000' will cause two synchronization stages (in addition to the first stage) to select Video_In as their data source. Since in FIG. 6, the first three synchronization elements choose Video_In as their input source, the first two stages are effectively ignored while printing. All stages beyond the third stage will then choose the output of the previous stage as their data input. Since the first two stages are ignored while printing, the circuit has the effect of calculating $t_{error}=2*t_{SLICECLK}$, and removing this error from the resulting Video_Out. The effect on the video output is illustrated in FIG. 7.

Figure 7:
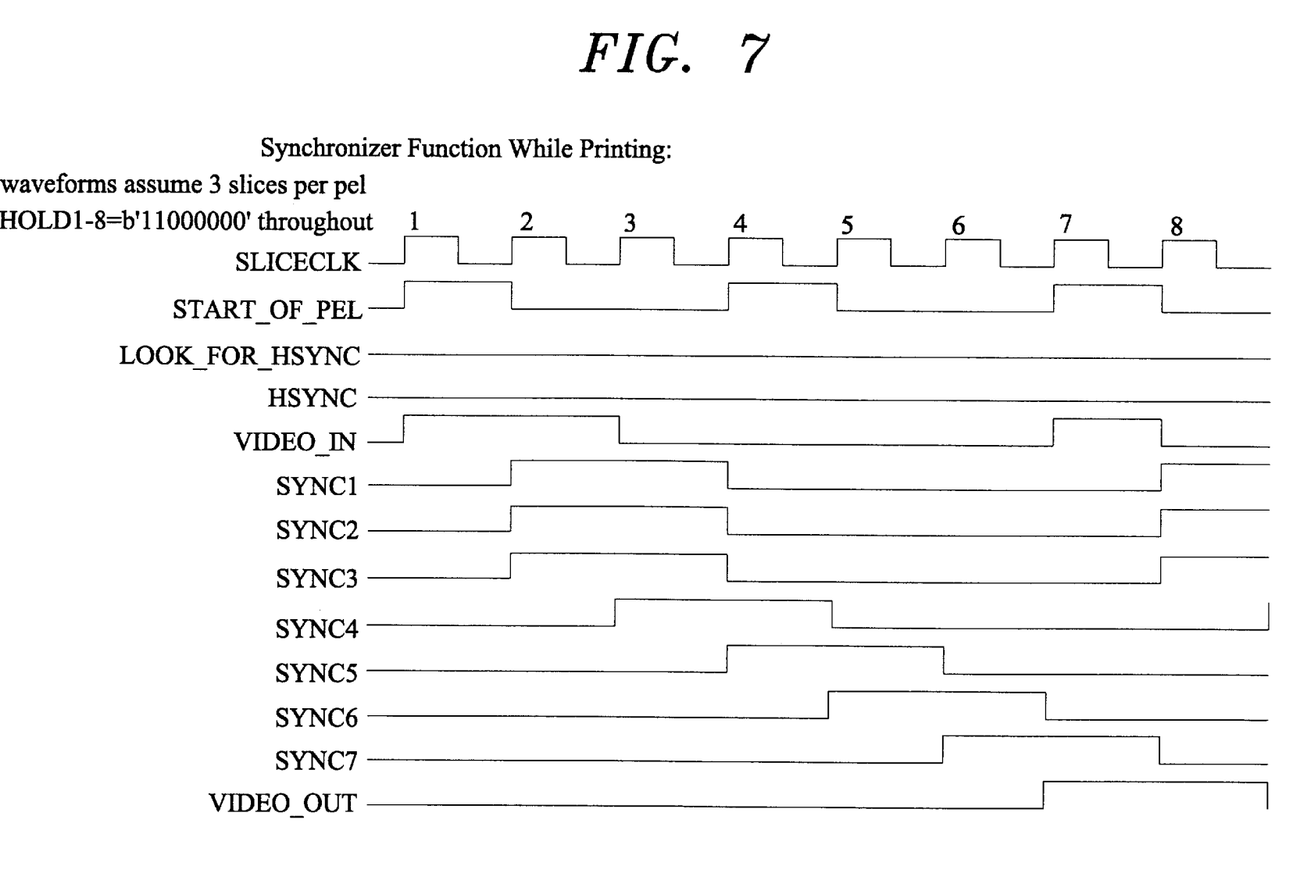
FIG. 7 is a waveform diagram of clock-based synchronization while printing, according to the present invention.

FIG. 7 shows that the first three elements in the Sync Chain 140 all choose Video_In as their data source. All remaining elements in the Sync Chain 140 choose the output of the previous stage. Effectively, then the first two Sync elements Sync1 and Sync2, are ignored or "subtracted out" of the delay chain, producing the desired effect. From FIG. 7, each clock-based delay element 120 has the effect of delaying Video_Out by one SLICECLK period. If 8 elements are used for an operating point in which 3 SLICE-CLKs occur per pel, then the final 5 stages of delay are added to each scan, regardless of the position of HSYNC. Such a delay adds a 5 SLICECLK absolute shift to the left margin which can be adjusted out by changing the pel-based left margin delay setting. In FIG. 7, Video_Out is delayed from Video_In by six SLICECLKs. Had the Hold Chain 150 been set to b'0000000', then Video_Out would have been delayed from Video_In by eight SLICECLKs. The two SLICECLK periods removed correspond to $t_{error}$.

The foregoing synchronizing method determines the position of HSYNC with respect to a pel-based PELCLK in terms of slices, or full periods of the sub-pel SLICECLK. A second method for determining the position of HSYNC, according to the present invention, is to measure the position of HSYNC in units of analog delay elements.

In the preferred embodiment of the invention, the clock-based chain described above is used to determine the position of HSYNC relative to PELCLK in units of slices. In addition, a more finely resolved method of synchronization is used to determine the position of HSYNC relative to SLICECLK in units of delay elements. These two methods work in parallel to determine the position of HSYNC relative to a pel and relative to a slice in synchronization mode. The resulting delay chains are then connected serially during print mode to provide a calculated amount of delay in units of slices as previously described, plus a calculated amount of delay units of delay stages as described below. The effect of combining both "layers" of synchronization is to provide synchronization accuracy resolved to a single delay stage time while saving the significant number of logic gates that would be required if the time-based chain were used alone.

Figure 8A:
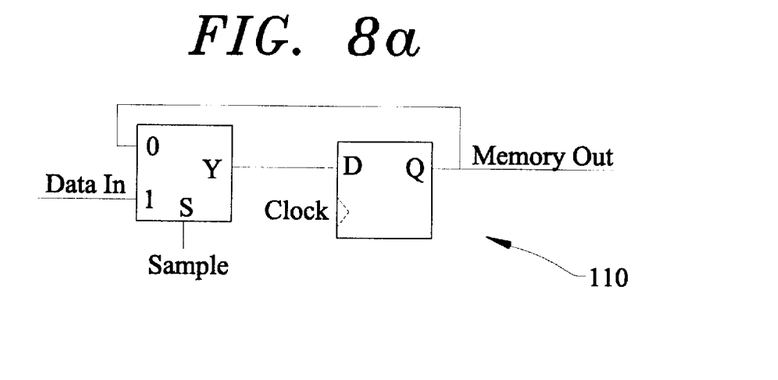
FIGS. 8a–c are diagrams of elements of a time-based delay chain in terms of digital logic elements, according to a second embodiment of the present invention.
Figure 8B:
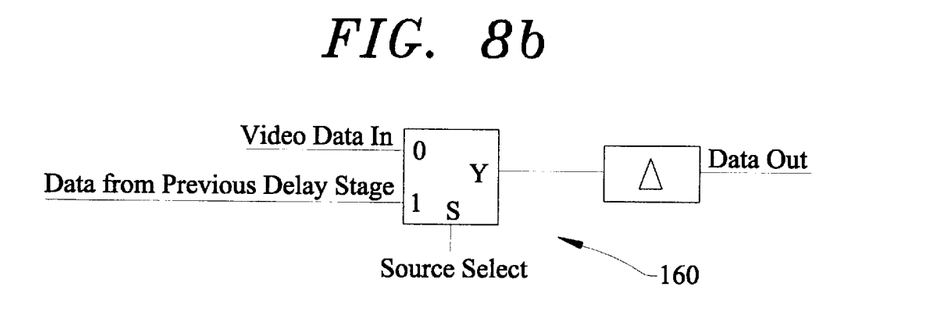
Figure 8C:
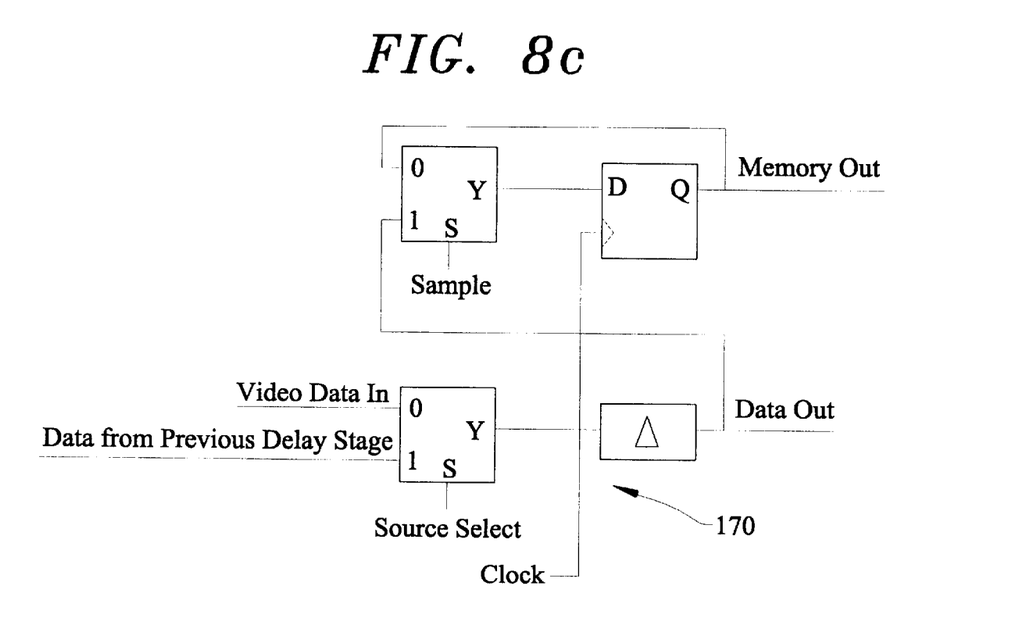

In the second embodiment, the basic building blocks of a time-based delay chain are very similar to those of the clock-based delay chain discussed previously. The time-based delay chain uses an identical synchronous memory element 110 to store the position of HSYNC relative to the clock. The time-based delay stage is similar to the clock-based delay stage except that the method of determining the delay differs. In the clock-based delay stage, the total delay incurred is equal to one period of the SLICECLK. In the time-based delay stage 160, the total delay incurred is equal to the total silicon speed delay through the multiplexer and the analog delay line. Thus, the total delay through a delay element is a variable number which changes depending upon actual circuit layout, supply voltage, ambient temperature of the device, and variations in delay are effectively calibrated-out by the operation of the circuit. The two foregoing building blocks are combined in FIG. 8 to form a Time-Based Synchronizer element 170.

Figure 9:
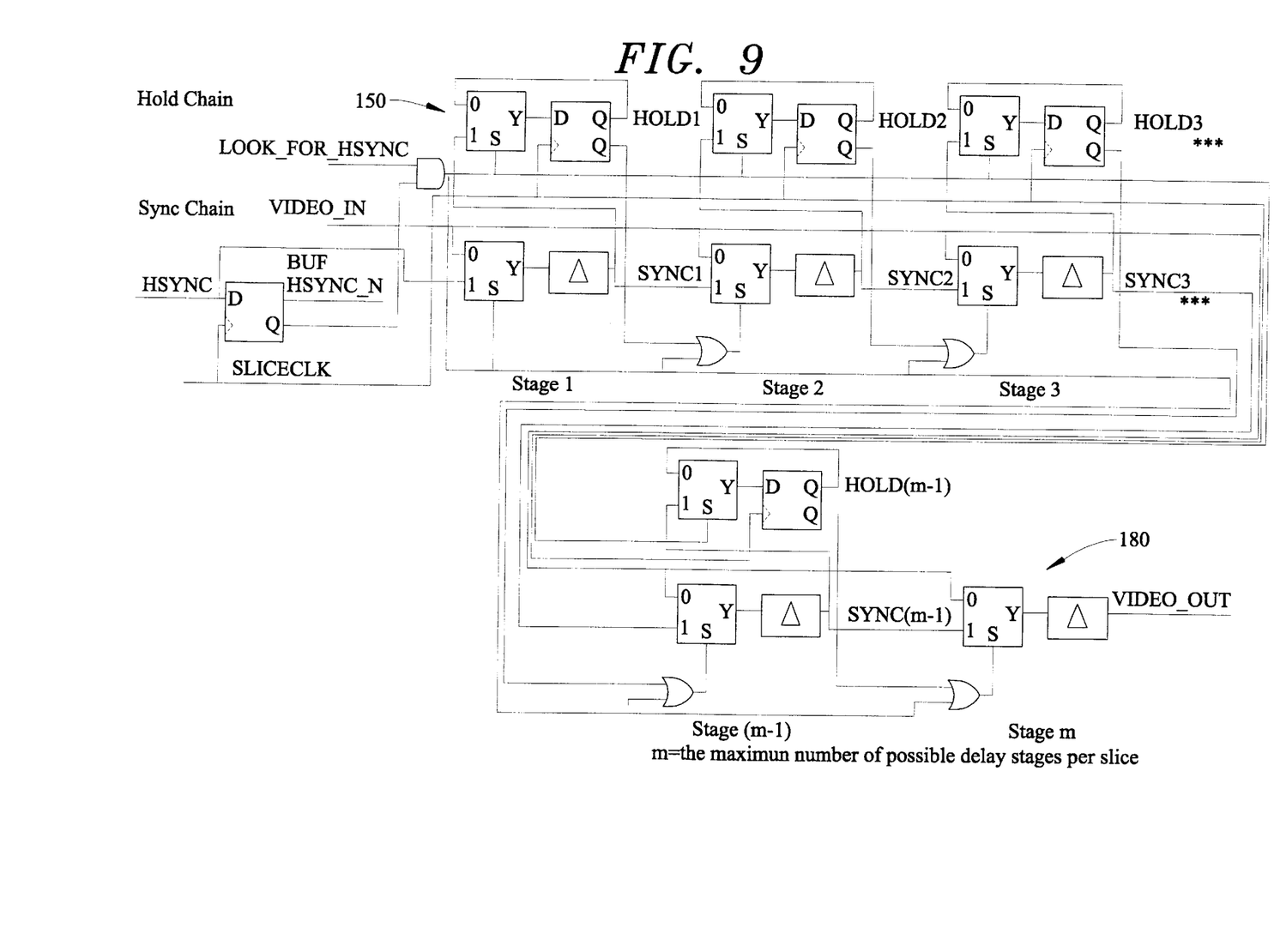
FIG. 9 is a block diagram showing the time-based delay chain with cascaded clock-based synchronizer elements of FIG. 8, according to the second embodiment of the present invention.

In a manner similar to the clock-based synchronizer elements 130, the time-based synchronizer elements 170 are cascaded as shown in FIG. 9. The time-based synchronization chain 180 also has a synchronization mode and a print mode as determined by the state of the Look_for_Hsync signal. When Look_for_Hsync is active, the Sync Chain 180 is sampled by the Hold Chain 150 on every SLICECLK active edge. Thus when an HSYNC enters the ASIC, it propagates some number of delay elements. On the next SLICECLK, the state of the Sync Chain 180 is sampled by the Hold Chain 150 and the sample control for the Hold Chain 150 is shut off by Buf_Hsync_N, an inverted version of the Buf_Hsync signal discussed previously. Once the Hold Chain 150 has stored the HSYNC propagation information, the control circuitry takes away the Look_for_Hsync control signal, causing the synchronization chain to flip into print mode. Once in print mode, the Hold Chain status is used to determine how many elements to subtract off of the total delay.

Figure 10:
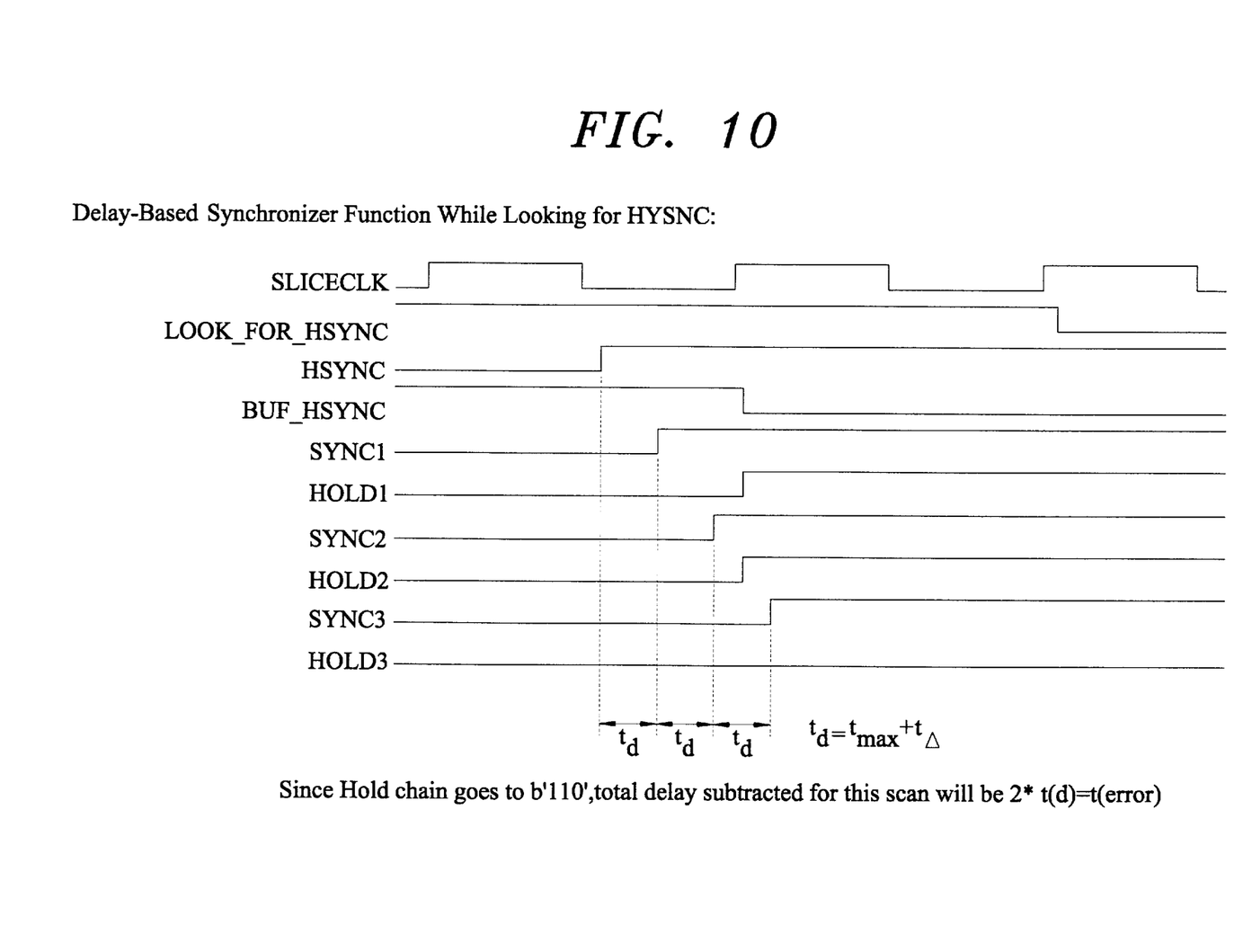
FIG. 10 is a waveform diagram of time-based synchronization while looking for HSYNC, according to the second embodiment of the present invention.

Sample waveforms for time-based synchronization are shown in FIG. 10. The circuit is initially in synchronization mode, as shown by a high level on Look_for_Hsync. Sometime during the first SLICECLK period, HSYNC is received. HSYNC propagates through Sync1 and Sync2 outputs prior to the next rising edge of SLICECLK. Upon the active edge of SLICECLK, HSYNC is recognized by the control circuitry (via Buf_Hsync_N) and causes Look_for_Hsync to shut off on the following SLICECLK. The low state of Buf_Hsync_N prohibits an additional sample of the Hold Chain 150 from taking place on the third SLICECLK shown. Therefore, the Hold Chain 150 retains the value it stored after the second SLICECLK or b'110'. This value indicates that the HSYNC signal propagated completely through the first two time-based delay elements 170 before the next SLICECLK rising edge. Thus, as with the clock-based delay elements, the first two time-based synchronization stages will be effectively ignored, subtracting off $t_{error}=2*t_d$, where $t_d=t_{mux}+t_{delay\ element}$.

The function provided by this circuit allows for extremely fine resolution on HSYNC synchronization. The size of the delay element can be chosen to provide the desired accuracy in synchronization. The finest accuracy would be provided if the delay element were left out entirely, making $t_d=t_{mux}+0$. In a 0.5 uM technology such as the Oki™ Semiconductor MSM98R family, HSYNC resolution of about 500 picoseconds (or half a nanosecond) would be achieved. However, note that more delay stages are required if the delay provided by each stage is less. The minimum number of delay stages required is given by the following equation:

Number of stages=Maximum SLICECLK period/Minimum Time delay per stage.

In this equation the minimum time delay per stage is the minimum propagation delay possible through a delay stage under best case environmental and process conditions. If fewer stages are used, the time-based synchronization chain will not be long enough to accurately measure all HSYNC pulses.

Pulse width modification is a primary concern when utilizing a long combined delay path to create accurate output pulses. With a long combined path, the additive effects of the differences between the low-to-high and high-to-low propagation delays of the components can cause a perfect input pulse to be greatly stretched or shrunk by the final output stage. Some small amount of pulse width modification is unavoidable, but the effects can be minimized. To minimize the possibility of pulse width modification, components were chosen so that differences in propagation delays would cancel each other out. Multiple tap points along the delay chain are provided, so that while running faster SLICECLKs, an earlier position along the delay chain can be chosen so as to skip the latter portion of the chain, thereby avoiding any pulse width modifications incurred during that portion of the chain.

As mentioned previously, the total delay through a delay element is a variable number which changes depending upon the actual circuit layout, supply voltage, ambient temperature of the device, and variations in silicon fabrication processing which effect speed. Variations in environmental and process conditions will be automatically compensated out by the time-based synchronization circuit. For example, if the silicon is 20% fast, then if 5 stages would normally comprise $t_{error}$, then the circuit will compensate during the synchronization phase to select 6 stages for $t_{error}$.

Since the same logic gates are used both as a means for measuring HSYNC and as the method for providing the necessary delay to video data, the effect of variations in circuit layout are minimized. For example, assuming that the third delay stage is 10% longer than the other delay stages, since the same logic gates are used for the third delay stage for both synchronization and printing, then the resulting accuracy of the circuit varies only by 10%. If, however, separate logic chains were used for synchronization and printing, the errors might be additive so that a 10% increase in the third stage of the synchronization coupled with a 10% reduction in the third stage of print delay would produce an overall (110%/90%)–100%=22% variation in synchronization accuracy, worst case.

For the circuit to operate successfully, a couple of points must be addressed. Once the HSYNC is detected, the higher-level pel-based logic must be informed by the synchronizer. For reliable operation, the signaling to the pel-based logic must always occur on the same active edge of the pel-based clock. If variation exists in signaling the pel-based logic, then the synchronization function will vary by an entire pel time.

Tap points may be provided along the clock-based chain as the selected VIDEO_OUT whenever the number of slices per pel is less than the maximum number possible. For instance, if the current operating point has three slices per pel, the output of the third synchronization element may be chosen as VIDEO_OUT rather than the nth element as shown in the figures. That minimizes the absolute delay applied to all data in three slices per pel mode.

Some methods of tuning the video pulse width allow the pulse width to be tuned to a finer resolution than the slice rate. If these methods required use of synchronous logic, then these functions would need to be inserted between the clock-based synchronization layer and the time-based synchronization layer. For example, video pulse widths may be tuned in a special mode based on either edge of SLICECLK. In another mode, video pulse widths can be tuned using delay lines to achieve even finer video pulse width control. Both methods for tuning video pulse widths are performed logically between the clock-based and time-based synchronization chains.

The delays between gates vary depending upon a number of factors including actual component placement and wiring within the die. The variability in placement and wiring can be reduced significantly if the subject logic is restricted to a small portion of the die. The present implementation includes floor planning of the silicon so that the SLICECLK based logic would be restricted to a small portion of the die, thereby minimizing variability due to placement and wiring. The circuit can thus achieve the highest obtainable silicon performance using semi-custom logic design methods.

The present invention, unlike conventional systems, performs synchronization on the data path as opposed to the clock path. The measurement of error between an synchronous event such as HSYNC and a system clock is achieved by allowing HSYNC to propagate into a chain of delay elements. Synchronization error is eliminated by delaying the video output by the remaining delay elements of the chain.

The synchronization method of the present invention allows the clock which controls the video conditioning logic to run continuously, thereby providing a clean, simple clock waveform crucial to modern high-level synchronous logic design methodologies.

The method of the present invention provides the capability for layering the accuracy of synchronization based upon the available clocks within the ASIC. For example, the specific implementation, set forth previously, provided the primary layer of synchronization relative to a pel boundary, and a secondary layer of synchronization relative to a slice boundary. The layering method allows highly accurate synchronization for an order of magnitude fewer logic gates than other approaches.

The accuracy of the synchronization provided is not limited by the speed at which clock based logic will run. Through the use of internal delay line chains, the synchronization concept can be expanded to virtually any accuracy needed, limited only by the silicon speed of the integrated circuit.

By providing selectable output tap point for choosing the source of the synchronized video, the minimal number of delay elements can be chosen based upon the frequency of the slice based clock. By allowing for a selectable tap point, the total variability introduced by the delay line chain length can be minimized.

The method of the present invention of synchronization further utilizes the same logic gates to serve as both the calibration detector while sampling the HSYNC signal and as the video stream delay while printing. By using the same logic gates, the effect of inaccuracies caused by the physical placement of the logic gates within the device and process variations across the die are minimized.

It is contemplated as part of the present invention that an asynchronous signal will be fed into a chain of clocked or analog elements, and the number of elements traversed into the chain at a next clock edge will be measured. Alternatively, measurement can be performed using a high speed digital counter/timer to measure time between an synchronous event and a discrete clock edge. In another embodiment an analog voltage ramp is initiated at an asynchronous event and the voltage at the next clock edge is then examined and remembered.

The delay can be adjusted by inserting data into the chain of clocked or analog delay elements, and eliminating error by bypassing a number of the delay elements which correspond to the error. Alternatively, the data can be inserted into a beginning of the chain of clocked or analog delay elements, and the error eliminated by bypassing a number of the delay elements at an end of said chain. The number of bypassed delay elements is derived from said error.

In another embodiment it is contemplated that data will be inserted into the beginning of multiple chains of clocked or analog delay elements, and each of the chains will have a different length. The error is eliminated by selecting an output of one of the chains depending upon the measured error.

The data may be inserted into a first-in-first-out (FIFO) structure, and extraction begun from the FIFO structure at a delay in time derived from the measured error. Yet another alternative inserts data into a chain of storage elements whose high-speed clock rate has been adjusted by an amount derived from the measured error.

The foregoing invention is based on the measurement of error as the relationship between the synchronous event and the next clock edge. With such a definition of error, the adjustment is performed by subtracting delay from the final output. The method can also be performed by reversing the definition, and measuring error as the relationship between a clock edge and the synchronous event. In such a case, the error could be eliminated by adding an appropriate delay to a final output.

Having described several embodiments of HSYNC synchronization in accordance with the present invention, it is believed that other modifications, variations and changes will be suggested to those skilled in the art in view of the description set forth above. It is therefor to be understood that all such variations, modifications and changes are believed to fall within the scope of the invention as defined in the appended claims.

What is claimed is:

1. A method of achieving line-to-line synchronization in a printer, with a high degree of synchronization accuracy, comprising:

providing a pel clock synchronous with pel generation;

providing a delay chain comprising a plurality of delay elements, each of said plurality of delay elements having a data out signal;

directing a horizontal synchronizing signal HSYNC into a first of said plurality of delay elements of said delay chain, said HSYNC being asynchronous from said pel clock;

determining a number of said plurality of delay elements of said delay chain which had their data out signal change state before an occurrence of a first cycle of said pel clock after said HSYNC is detected; and directing a video data input signal through delay elements of said delay chain that did not previously have their data out signal change state, thereby shifting a phase of said video data input signal through a portion of said plurality of delay elements.

2. The method as recited in claim 1, wherein said delay chain comprises a high speed clocked shift register.

3. The method as recited in claim 1, wherein said delay elements of said delay chain comprise a series of analog delay elements.

4. The method as recited in claim 1, wherein said delay chain comprises a cascaded series of logic elements to accurately shift said HSYNC to one of said logic elements within a given sampling period.

5. The method as recited in claim 4, wherein said logic elements each comprises a delay stage and a memory element, each said delay stage providing a predetermined amount of time delay from input signal change of logic state to output signal change of logic state, and each said memory element remembering, for an entire scan, if said HSYNC at a start of said scan passed completely through said delay stage prior to a beginning of a next sampling period.

6. The method as recited in claim 5, wherein each said delay stage comprises a multiplexer and a flip-flop.

7. The method as recited in claim 5, wherein each said memory element comprises a multiplexer and a flip-flop.

8. The method as recited in claim 5, wherein each said delay stage is clock-based.

9. The method as recited in claim 8, wherein a status of said HSYNC as it is shifted to one of said logic elements is determined relative a pel-based pel clock, in terms of full periods of a slice clock operating faster than said pel clock.

10. The method as recited in claim 9, wherein a status of said HSYNC as it is shifted to one of said logic elements is finely resolved to said slice clock in units of said delay elements.

11. The method as recited in claim 9, wherein in any one of said logic elements, total delay is equal to one period of said slice clock.

12. The method as recited in claim 8, further comprising providing a synchronization chain formed by said delay stages and said memory element of said logic elements.

13. The method as recited in claim 12, further comprising providing a hold chain formed from a chain of said memory elements to sample a state of said clock-based delay elements, wherein said sampling is performed once per pel until said HSYNC arrives.

14. The method as recited in claim 12, wherein upon detection of said HSYNC, said synchronization chain begins operating in a print mode.

15. The method as recited in claim 14, further comprising, in said print mode, providing a calculated amount of delay in units of slices, and in an equivalent time delay created by an amount of delay stages.

16. The method as recited in claim 5, wherein each said delay stage is time-based.

17. The method as recited in claim 16, wherein a status of said HSYNC as it is shifted to one of said logic elements is determined in units of analog delay elements.

18. The method as recited in claim 16, wherein in any of said logic elements, total delay is equal to a total silicon propagation delay through a logic circuit and the total response time delay through an analog delay line.

19. The method as recited in claim 16, further comprising providing a synchronization chain formed by said delay stages and said memory elements of said logic elements.

20. The method as recited in claim 19, further comprising providing a hold chain formed from a chain of said memory elements to sample a state of said time-based delay elements, wherein said sampling is performed on every active edge of a slice clock.

21. The method as recited in claim 20, wherein upon detection of said HSYNC, said synchronization chain begins operating in a print mode, and a status of said hold chain is used to determine how many logic elements to subtract from said delay chain.

22. The method as recited in claim 20, further comprising providing a desired accuracy in synchronization by selecting a size of a delay unit.

23. A method of achieving line-to-line synchronization in a printer, with a high degree of synchronization accuracy, comprising:

applying a clock signal and a video data signal to at least one synchronizer element of a data path;

directing a horizontal synchronizing signal HSYNC into a first stage of a chain of delay elements in said data path, said HSYNC being asynchronous from a system clock, said HSYNC propagating through at least one of said stages of said chain of delay elements;

determining synchronization error between said HSYNC and said system clock by storing a shift location of HSYNC through a previously unknown number of stages of said chain of delay elements through which HSYNC propagated before an occurrence of said system clock;

reducing said synchronization error by directing said video data signal through a portion of said stages of said chain of delay elements past said shift location of HSYNC in said chain of delay elements, thereby delaying said video data signal.

24. The method as recited in claim 23, further comprising running said system clock continuously to provide a clean and simple clock waveform.

25. The method as recited in claim 23, further comprising layering synchronization accuracy by utilizing different clocks.

26. The method as recited in claim 25, further comprising providing a primary layer of synchronization relative to a pel boundary, and a second layer of synchronization relative to a slice boundary.

27. The method as recited in claim 23, further comprising utilizing a same set of logic gates to serve as both a calibration detector, while sampling said HSYNC, and as a video stream delay while printing.

28. The method as recited in claim 23, wherein said printer is not imaging on a printable section of a scan when said HSYNC is detected, so that said video data signal need not be passed through said chain of delay elements.

29. The method as recited in claim 28, wherein said HSYNC is passed into said chain of delay elements while said printer is not imaging on a printable portion of a scan.

30. The method as recited in claim 23, wherein said chain of delay elements is one of: (a) a high speed clocked shift register and (b) a series of analog logic delays.

31. A method of achieving line-to-line synchronization by substantially eliminating synchronization error between an asynchronous event and a discrete clock edge of a continuously running clock signal, comprising:

sampling a status of a chain of sample and hold elements between an occurrence of said asynchronous event and an occurrence of said discrete clock edge;

directing a serial data signal through a plurality of delay elements, a number of which is not determined until after said status of the chain of sample and hold elements has been determined after the occurrence of said discrete clock edge; and reducing said synchronization error by controlling said number of delay elements through which said serial data signal is directed, thereby adjusting a delay to said serial data signal.

32. The method as recited in claim 31, wherein during said sampling of a status of a chain of sample and hold elements, an analog voltage ramp is initiated at said asynchronous event and a voltage is sampled and stored at a next clock edge.

33. The method as recited in claim 31, wherein said adjusting a delay to said serial data signal further comprises (a) inserting data into a beginning of multiple chains of one of clocked and analog delay elements, each of said multiple chains having a different length, and (b) substantially eliminating said synchronization error by selecting an output of one of said multiple chains depending upon a measurement of said error.

34. An HSYNC delay circuit, comprising:

a plurality of synchronizer elements, each of said synchronizer elements comprising a sample and hold element, and a delay stage;

a video data in signal that is electrically connected to each of the delay stages of said plurality of synchronizer elements;

a clock signal that is electrically connected to each of the delay stages and to each of the sample and hold elements, of said plurality of synchronizer elements;

a start signal that is electrically connected to each of the sample and hold elements of said plurality of synchronizer elements, and which controls a mode of operation of said sample and hold elements of said plurality of synchronizer elements; and an HSYNC signal that is electrically connected to a first of the delay stages of said plurality of synchronizer elements;

wherein each of said sample and hold elements generates a memory out signal which is electrically connected to an input of an adjacent of said plurality of synchronizer elements, and each of said delay stages generates a data out signal which is electrically connected to an input of the same adjacent of said plurality of synchronizer elements, and wherein a final of said delay stages outputs a video data out signal.

35. The HSYNC circuit as recited in claim 34, wherein each of said sample and hold elements comprises a multiplexer and a flip-flop.

36. The HSYNC circuit as recited in claim 34, wherein each of said delay stages comprises a multiplexer and a flip-flop.

37. The HSYNC circuit as recited in claim 34, wherein said video data in signal comprises a serial data signal of data bits representing bitmap data to be provided to a print engine of a printer.

38. The HSYNC circuit as recited in claim 34, wherein said clock signal is output from a continuously running clock having a period equivalent to a time interval for printing a single slice of a pel on a laser printer.

39. The HSYNC circuit as recited in claim 34, wherein said HSYNC signal makes a logic transition asynchronously from said clock signal and said start signal, and is derived from an optical sensor that is illuminated by a sweep of laser light of a print engine of a laser printer.

40. The HSYNC circuit as recited in claim 34, wherein said start signal comprises a start__of__pel signal logically AND'ed with a look__for__hsync signal.

41. The HSYNC circuit as recited in claim 40, wherein during a synchronization mode of operation: (a) after a transition of said HSYNC signal but before a beginning of a next start__of__pel signal, the data out signal of at least one of said delay stages changes logic states, thereby causing the next of said delay stages to exhibit a change of state after a time delay, (b) said start signal samples the logic state of said delay stages at the beginning of each start__of__pel signal, and (c) said sample and hold elements maintain the logic state of said delay stages.

42. The HSYNC circuit as recited in claim 41, wherein during a print mode of operation: (a) said video data in signal is directed around said delay stages that changed logic states during the preceding synchronization mode of operation, and (b) said video data in signal is directed through said delay stages that did not change logic states during the preceding synchronization mode of operation until being directed through said final of said delay stages to become said video data out signal.

43. An HSYNC delay circuit, comprising:
   a plurality of synchronizer elements, each of said synchronizer elements comprising a sample and hold element, and a delay stage;
   a video data in signal that is electrically connected to each of the delay stages of said plurality of synchronizer elements;
   a clock signal that is electrically connected to each of the sample and hold elements of said plurality of synchronizer elements;
   a start signal that is electrically connected to each of the sample and hold elements and to each of the delay stages of said plurality of synchronizer elements, and which controls a mode of operation of said sample and hold elements of said plurality of synchronizer elements; and
   an HSYNC signal that is electrically connected to a first of the delay stages of said plurality of synchronizer elements;
   wherein each of said sample and hold elements generates a memory out signal which is electrically connected to an input of an adjacent of said plurality of synchronizer elements, and each of said delay stages generates a data out signal which is electrically connected to an input of the same adjacent of said plurality of synchronizer elements, and wherein a final of said delay stages outputs a video data out signal.

44. The HSYNC circuit as recited in claim 43, wherein each of said sample and hold elements comprises a multiplexer and a flip-flop.

45. The HSYNC circuit as recited in claim 43, wherein each of said delay stages comprises a multiplexer and an analog delay element.

46. The HSYNC circuit as recited in claim 43, wherein said video data in signal comprises a serial data signal of data bits representing bitmap data to be provided to a print engine of a printer.

47. The HSYNC circuit as recited in claim 43, wherein said clock signal is output from a continuously running clock having a period equivalent to a time interval for printing a single slice of a pel on a laser printer.

48. The HSYNC circuit as recited in claim 43, wherein said HSYNC signal makes a logic transition asynchronously from said clock signal and said start signal, and is derived from an optical sensor that is illuminated by a sweep of laser light of a print engine of a laser printer.

49. The HSYNC circuit as recited in claim 43, wherein said start signal comprises a logically inverted HSYNC signal logically AND'ed with a look_for_hsync signal.

50. The HSYNC circuit as recited in claim 49, wherein during a synchronization mode of operation: (a) after a transition of said HSYNC signal but before a next slice clock signal transition, a data out signal of at least one of said delay stages changes logic states, thereby causing the next of said delay stages to exhibit a change of state after a time delay, and (b) said sample and hold elements maintain the logic state of said delay stages.

51. The HSYNC circuit as recited in claim 50, wherein during a print mode of operation: (a) said video data in signal is directed around said delay stages that changed logic states during the preceding synchronization mode of operation, and (b) said video data in signal is directed through said delay stages that did not change logic states during the preceding synchronization mode of operation until being directed through said final of said delay stages to become said video data out signal.

* * * * *